(12) United States Patent
Sasaki

(10) Patent No.: US 10,934,954 B2
(45) Date of Patent: Mar. 2, 2021

(54) ENGINE CONTROL SYSTEM

(71) Applicant: DENSO CORPORATION, Kariya (JP)

(72) Inventor: Kazushi Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/542,481

(22) Filed: Aug. 16, 2019

(65) Prior Publication Data

US 2020/0072141 A1 Mar. 5, 2020

(30) Foreign Application Priority Data

Aug. 29, 2018 (JP) .............................. JP2018-159993

(51) Int. Cl.

| F02D 41/06 | (2006.01) |
|---|---|
| F02D 41/00 | (2006.01) |
| F02D 41/38 | (2006.01) |
| F02M 26/53 | (2016.01) |
| F02N 11/08 | (2006.01) |
| F02M 26/54 | (2016.01) |

(52) U.S. Cl.
CPC ..... *F02D 41/0055* (2013.01); *F02D 41/0002* (2013.01); *F02D 41/062* (2013.01); *F02D 41/064* (2013.01); *F02D 41/065* (2013.01); *F02D 41/38* (2013.01); *F02M 26/53* (2016.02); *F02M 26/54* (2016.02); *F02N 11/08* (2013.01); *F02D 2041/0017* (2013.01); *F02D 2200/04* (2013.01); *F02D 2200/60* (2013.01)

(58) Field of Classification Search
CPC ............. F02D 41/0002; F02D 41/0055; F02D 41/042; F02D 41/06; F02D 41/062; F02D 41/064; F02D 41/065; F02D 41/144; F02D 41/1454; F02D 2200/60; F02M 26/53; F02M 26/54; F02N 11/0803; F02N 11/0825; F02N 11/0829
USPC ......... 701/104; 123/179.3, 179.18, 361, 399, 123/568.16, 568.21, 568.23, 568.24, 704; 73/114.36, 114.74
See application file for complete search history.

(56) References Cited

U.S. PATENT DOCUMENTS

| 3,960,130 A * | 6/1976 | Peterson, Jr. ......... F02D 31/003 |
| | | 123/179.18 |
| 4,177,784 A * | 12/1979 | Tatsutomi ................. F02D 9/02 |
| | | 123/179.18 |
| 4,213,437 A * | 7/1980 | Onofrio ................. B01D 46/24 |
| | | 123/179.18 |
| 6,499,455 B1 * | 12/2002 | Page ......................... F02D 9/02 |
| | | 123/198 DC |

(Continued)

FOREIGN PATENT DOCUMENTS

DE 198 48 368 C2 4/2000

*Primary Examiner* — Erick R Solis
(74) *Attorney, Agent, or Firm* — Nixon & Vanderhye P.C.

(57) ABSTRACT

In a control system for an internal combustion engine, a control unit controls a throttle valve provided in an intake pipe and/or an on-off valve provided in an exhaust gas recirculation pipe when an ignition switch is turned on, in such a manner that an opening degree of the throttle valve and/or an opening degree of the on-off valve is made to be larger than that of a condition before the ignition switch is turned on. In the above Ig-on control, in which the throttle valve and/or the on-off valve is largely opened, a piston is reciprocated in order that gas in a combustion chamber is discharged to an outside of the combustion chamber.

3 Claims, 4 Drawing Sheets

(56) References Cited

U.S. PATENT DOCUMENTS

| | | | |
|---|---|---|---|
| 9,689,365 B2* | 6/2017 | Bleyer | F02D 41/0025 |
| 2003/0024506 A1* | 2/2003 | Oda | F02D 9/02 |
| | | | 123/399 |
| 2003/0075146 A1* | 4/2003 | Niki | F02D 11/107 |
| | | | 123/396 |
| 2009/0164106 A1* | 6/2009 | Enomoto | F02D 41/0055 |
| | | | 701/111 |
| 2013/0191008 A1* | 7/2013 | Surnilla | F02D 41/144 |
| | | | 701/104 |
| 2013/0332050 A1* | 12/2013 | Song | F02D 41/144 |
| | | | 701/104 |
| 2016/0177853 A1* | 6/2016 | Uhrich | F02D 41/0077 |
| | | | 701/104 |
| 2016/0348598 A1* | 12/2016 | Dixon | F02D 41/0077 |
| 2017/0152953 A1 | 6/2017 | Misumi et al. | |
| 2018/0224000 A1 | 8/2018 | Misumi et al. | |
| 2019/0032590 A1* | 1/2019 | Conis | F02D 41/221 |
| 2019/0170061 A1* | 6/2019 | Dudar | F02B 37/225 |
| 2019/0195153 A1* | 6/2019 | Dudar | F02M 26/05 |

\* cited by examiner

ENGINE CONTROL SYSTEM

CROSS REFERENCE TO RELATED APPLICATION

This application is based on Japanese Patent Application No. 2018-159993 filed on Aug. 29, 2018, the disclosure of which is incorporated herein by reference.

FIELD OF TECHNOLOGY

The present disclosure relates to a control system for an internal combustion engine.

BACKGROUND

It is known in the art that a double eccentric valve is provided in a re-circulation passage for exhaust gas of the internal combustion engine (hereinafter, the engine).

In a case that the double eccentric valve is used as an on-off valve to be provided in an exhaust gas recirculation pipe, the double eccentric valve remains in a condition that the double eccentric valve is not completely closed when the engine is not operated. Then, a part of exhaust gas may unintentionally pass through the double eccentric valve and thereby the exhaust gas may flow into a combustion chamber via the exhaust gas recirculation pipe. When it happens, starting property for an operation of the engine may be decreased due to the exhaust gas flowing into the combustion chamber. Since the above problem may be caused by a tucking of extraneous material and/or a failure of a valve closing operation, the above problem is a common problem not only for the case using the double eccentric valve but also for a case using an on-off valve of any other type.

SUMMARY OF THE DISCLOSURE

The present disclosure is made in view of the above problem. It is an object of the present disclosure to provide a control system for an internal combustion engine, according to which a starting operation of the internal combustion engine can be improved.

According to one of features of the present disclosure, a control system for an internal combustion engine comprises;

a combustion chamber for combusting fuel therein;

a piston movably provided in a cylinder for forming the combustion chamber, a volume of which is changed when the piston is reciprocated;

an intake pipe for supplying air to the combustion chamber;

a throttle valve movably provided in the intake pipe and controlling an amount of the air to be supplied to the combustion chamber;

an exhaust gas recirculation pipe for recirculating a part of exhaust gas emitted from the combustion chamber into the intake pipe;

an on-off valve provided in the exhaust gas recirculation pipe and controlling an amount of the exhaust gas to be supplied to the combustion chamber; and a control unit for controlling each operation of the piston, the throttle valve and the on-off valve, wherein the control unit carries out an Ig-on control when an ignition switch is turned on, or the control unit carries out an Ig-off control when the ignition switch is turned off, and wherein, in the Ig-on control or in the Ig-off control, an opening degree of the throttle valve and/or the on-off valve is made to be larger than that of a condition before the ignition switch is turned on or larger than that of a condition before the ignition switch is turned off, and the piston is reciprocated to discharge gas from the combustion chamber to an outside thereof in such a condition that the throttle valve and/or the on-off valve is opened larger.

According to another feature of the present disclosure, the control unit controls an amount of fuel to be injected into the combustion chamber based on oxygen density in the intake pipe detected when the ignition switch is turned on, so that fuel injection is carried out at such an adjusted amount when starting a normal operation of the engine.

According to the control system for the internal combustion engine of the present disclosure, it is possible to avoid a situation that performance of a starting operation for the engine is decreased even when exhaust gas unintentionally flows into a combustion chamber of the engine.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
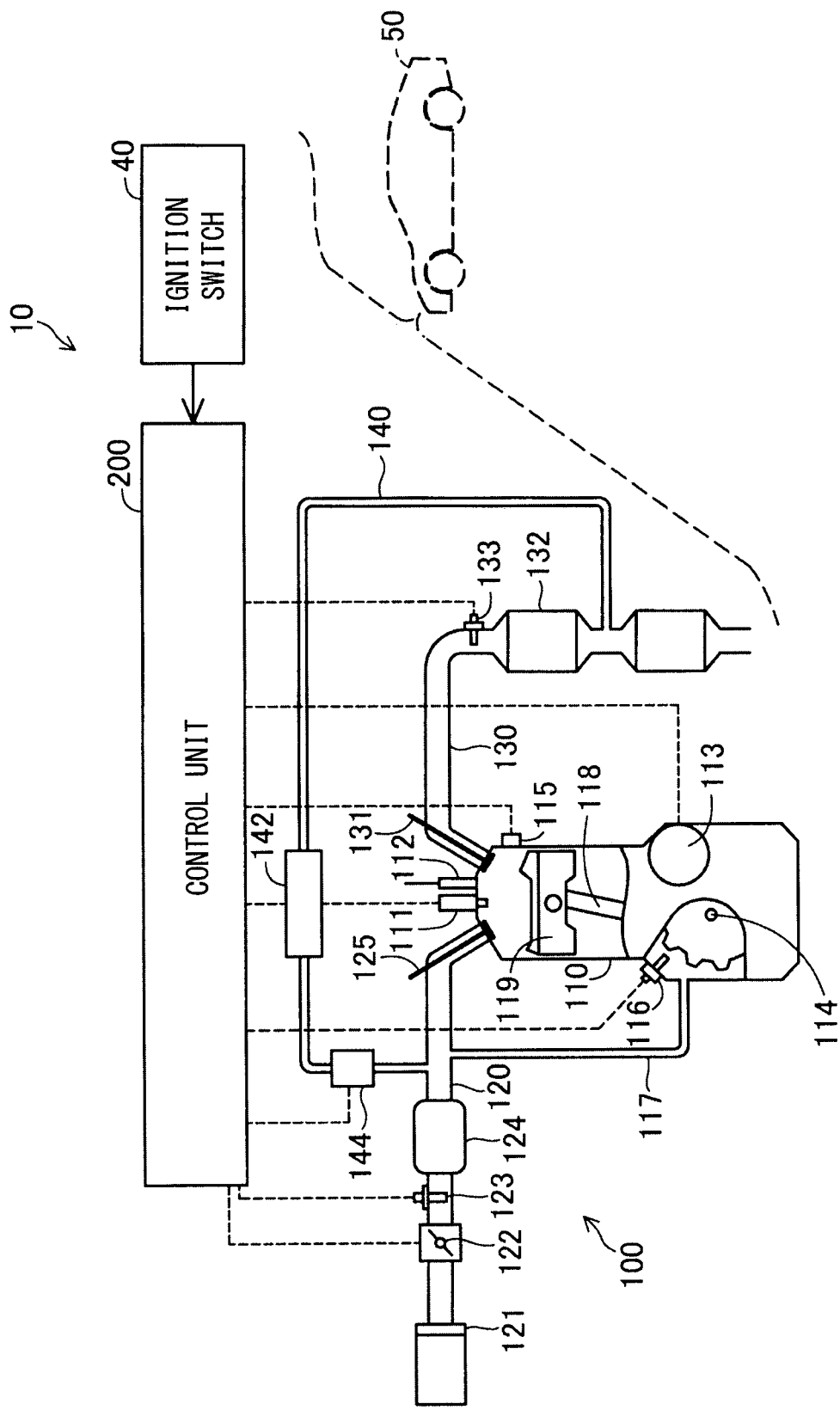
FIG. 1 is a schematic view showing an outline of a control system for an internal combustion engine according to a first embodiment of the present disclosure.

The present disclosure will be explained hereinafter by way of multiple embodiments and/or modifications with reference to the drawings. The same reference numerals are given to the same or similar structures and/or portions in order to avoid repeated explanation.

First Embodiment

As shown in FIG. 1, a control system 10 for an internal combustion system 100 (hereinafter, the engine 100) includes an electronic control unit 200 (hereinafter, the ECU 200) and an ignition switch 40. The ignition switch 40 is a switch for starting or stopping an operation of the engine 100. In the present embodiment, the engine 100 is mounted in an automotive vehicle 50 (hereinafter, the vehicle 50).

The engine 100 produces a driving power for the vehicle 50 by combusting fuel (such as, gasoline, light diesel oil, or the like). The engine 100 has multiple combustion chambers 110 and multiple fuel injection valves 112 (hereinafter, the fuel injector 112). Air is supplied into each of the combustion chambers 110 through an intake pipe 120. In FIG. 1, only one combustion chamber 110 and one fuel injector 112 are shown for the purpose of showing the structure of the engine 100 in a simplified manner. Each of an air cleaner 121, a throttle valve 122, an intake-air pressure sensor 123, a buffer tank 124 is provided in the intake pipe 120 in a direction from an upstream side to a downstream side.

When the fuel is injected from the fuel injector 112 into the combustion chamber 110, a mixture of the air and the fuel (hereinafter, the air-fuel mixture) is combusted in the combustion chamber 110. Exhaust gas generated by the combustion is discharged into the atmosphere via an exhaust pipe 130. An air-fuel ratio sensor 133 (hereinafter, the A/F sensor 133), a catalytic converter 132 are provided in the exhaust pipe 130 in the direction from the upstream side to the downstream side. The exhaust pipe 130 and the intake pipe 120 are connected to each other by an exhaust gas recirculation pipe 140 (hereinafter, the EGR pipe 140). An EGR cooler 142 and an on-off valve 144 (hereinafter, the EGR valve 144) are provided in the EGR pipe 140. In the present embodiment, the on-off valve 144 is composed of a double eccentric valve.

Multiple spark plugs 111, the fuel injectors 112, intake valves 125, exhaust valves 131, a knock sensor 115, a crank-angle sensor 116 and so on are provided in the engine 100. The knock sensor 115 is a vibration sensor for detecting vibration of the engine 100. The crank-angle sensor 116 is a rotational speed sensor for detecting rotational speed of the engine 100. A blow-by gas pipe 117 is provided at a position below the crank-angle sensor 116. A blow-by gas is supplied to the intake pipe 120 via the blow-by gas pipe 117. The blow-by gas pipe 117 is connected to the intake pipe 120 at a position downstream of a connecting point between the EGR pipe 140 and the intake pipe 120.

A piston 119 is provided in each of cylinders of the engine 100 to form the combustion chamber 110. A volume of the combustion chamber 110 is changed when the piston 119 is reciprocated. The piston 119 is connected to a crank shaft 114 via a connecting rod 118. The connecting rod 118 converts a reciprocal movement of the piston 119 into a rotational movement of the crank shaft 114. The crank shaft 114 is operatively connected to a starter motor 113, so that the crank shaft 114 is rotated by the starter motor 113 when starting the operation of the engine 100 (when cranking the engine 100).

In the present embodiment, the engine 100 is composed of a four-cycle engine, which is operated with four strokes during the reciprocal movement of the piston 119 in two times. The four strokes include an intake stroke, a compression stroke, an explosion stroke and an exhaust stroke. Spark ignition is carried out in the compression stroke and the explosion stroke. The parts and components shown in FIG. 1 are examples. Any other parts and/or components may be provided to the engine 100.

Output of the engine 100 is reduced in speed by a transmission apparatus (not shown) provided in the vehicle 50. The engine output having a desired rotational speed and torque is transmitted to a driving shaft (not shown) of the vehicle 50 via a differential gear (not shown). In addition, the engine output is transmitted to a motor generator (not shown) of the vehicle 50 via a driving mechanism (not shown).

The ECU 200 controls the vehicle 50 by controlling the engine 100, which works as a driving power source for the vehicle 50. In the present embodiment, the ECU 200 controls the output of the engine 100 by controlling a fuel injection amount from the fuel injector 112 to the combustion chambers 110, an opening degree of the throttle valve 122 and so on based on a vehicle speed, a stepping stroke of a brake pedal or the like. In addition, the ECU 200 carries out an exhaust-gas control. In the present embodiment, an Ig-on control is carried out as the exhaust-gas control, as explained below with reference to FIG. 2.

Figure 2:
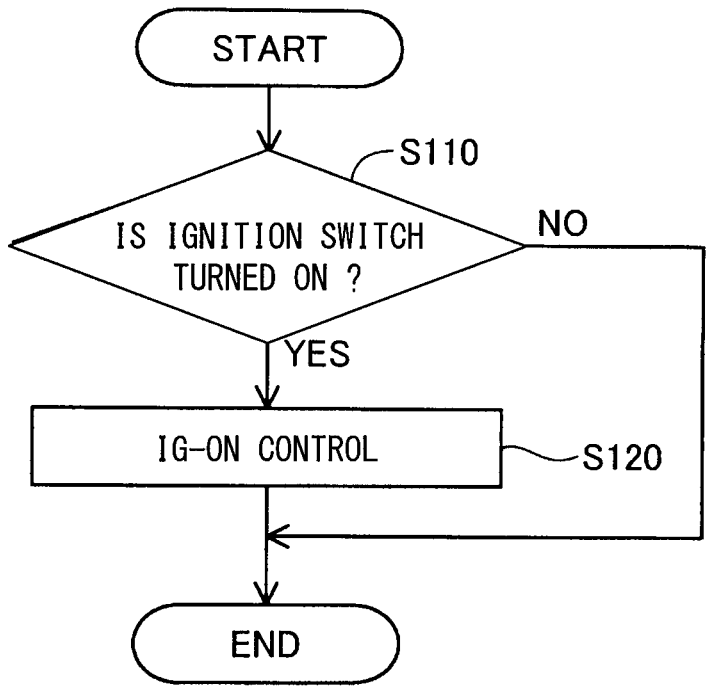
FIG. 2 is a flowchart showing a process for an exhaust-gas control according to the first embodiment.

The ECU 200 determines at first whether the ignition switch 40 is turned on or not at a step S110 of FIG. 2. When it determines that the ignition switch 40 is not turned on (NO at the step S110), the process of FIG. 2 goes to an end, without carrying out the Ig-on control.

When the ECU 200 determines that the ignition switch 40 is turned on (YES at the step S110), the process goes to a step S120 to carry out the Ig-on control. Then, the process of FIG. 2 goes to the end. In the step S120, the ECU 200 controls at lease one of the throttle valve 122 and the on-off valve 144 in such a way that an opening degree thereof becomes larger than that of a condition before the ignition switch 40 is turned on. In addition, the ECU 200 drives the starter motor 113 to reciprocate the plunger 119 in a condition that at least one of the throttle valve 122 and the on-off valve 144 is opened more largely than a valve opened condition before the ignition switch 40 is turned on. As a result, gas in the combustion chamber 110 is discharged. In the present embodiment, the ECU 200 operates both of the throttle valve 122 and the on-off valve 144, so that each valve opening degree becomes larger than the valve opened condition of the respective valves 122 and 144 before the ignition switch 40 is turned on. Thereafter, the ECU 200 starts a normal operation of the engine 100, that is, a normal operation for the combustion of the air-fuel mixture in the combustion chamber 110 by operating the spark plug 111 and the fuel injector 112.

When the engine 100 is not in its operation, pressure is generally not applied to the on-off valve 144 from a side of the intake pipe 120. Therefore, the on-off valve 144 of the double eccentric valve is in a condition that the on-off valve 144 is not fully closed. In such a condition of the on-off valve 144 (not fully closed condition), a tucking of extraneous material or a failure of a valve closing operation may occur. Then, the outside air may enter the exhaust pipe 130 and thereby the exhaust gas may pass through the on-off valve 144 to the intake pipe 120. When the operation of the engine 100 is started in the above condition, the exhaust gas reaching at the intake pipe 120 may be supplied into the combustion chamber 110. As a result, a starting operation of the engine 100 may become worse.

However, in the control system 10 for the engine 100 (hereinafter, the engine control system 10) of the present embodiment, when the ignition switch 40 is turned on, the valve opening degree of the throttle valve 22 and/or the on-off valve 144 is made larger than the valve opening degree thereof in the condition before the ignition switch 40 is turned on. And the piston 119 is operated to reciprocate to thereby discharge the gas from the combustion chamber 110 to the outside, which existed in the intake pipe 120 and in the combustion chamber 110 before the ignition switch 40 is turned on. According to the above operation, it is possible to discharge the exhaust gas, which reached at the intake pipe 120, to the exhaust pipe 130 through the combustion chamber 110, before starting the normal operation of the engine 100. As a result, it is possible to avoid a situation that an engine starting property is decreased. A learning control may be carried out for the sensors before the Ig-on control or during a period between the Ig-on control and a start of the normal operation for the actual combustion.

Second Embodiment

Figure 3:
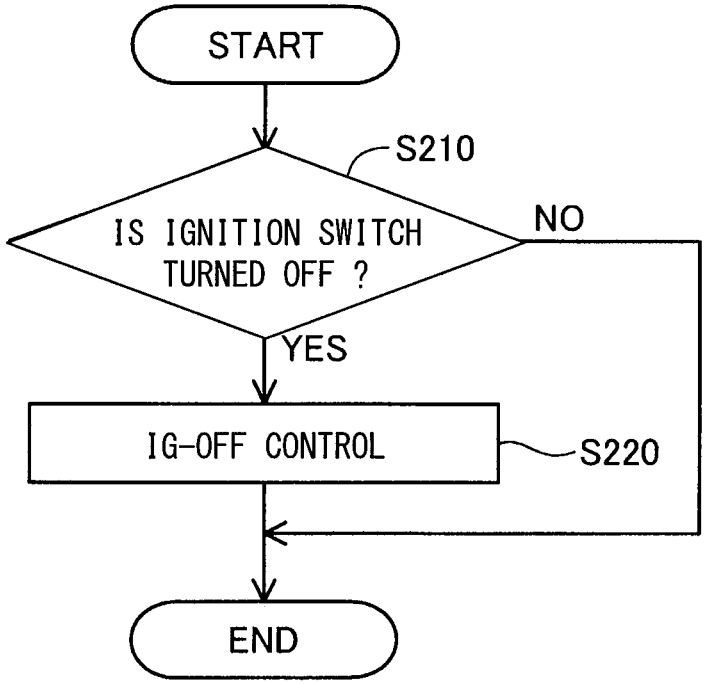
FIG. 3 is a flowchart showing a process for an exhaust-gas control according to a second embodiment.

In a second embodiment, an Ig-off control is carried out as the exhaust-gas control, instead of the Ig-on control of the first embodiment. The Ig-off control may be done in addition to the Ig-on control for the exhaust-gas control. The second embodiment will be explained with reference to FIG. 3.

The ECU 200 determines at first whether the ignition switch 40 is turned off or not at a step S210. When it determines that the ignition switch 40 is not turned off (NO at the step S210), the process of FIG. 3 goes to an end, without carrying out the Ig-off control.

When the ECU 200 determines that the ignition switch 40 is turned off (YES at the step S210), the process goes to a step S220 to carry out the Ig-off control. Thereafter, the process of FIG. 3 goes to the end. In the Ig-off control of the step S220, the ECU 200 controls at least one of the throttle valve 122 and the on-off valve 144 in such a way that the opening degree thereof becomes larger than that of the condition before the ignition switch 40 is turned off. In addition, the plunger 119 is reciprocated through inertia in a condition that at least one of the throttle valve 122 and the on-off valve 144 is opened more largely than the valve opened condition before the ignition switch 40 is turned off. As a result, gas in the combustion chamber 110 is discharged. In the present embodiment, the ECU 200 operates both of the throttle valve 122 and the on-off valve 144, so that each valve opening degree becomes larger than the valve opened condition before the ignition switch 40 is turned off. In the present embodiment, the plunger 119 is reciprocated through inertia. However, the plunger 119 may be reciprocated by the starter motor 113. In addition, the learning control may be carried out for the sensors after the Ig-off control.

According to the above operation, in which the Ig-off control is carried out, it is possible to discharge the exhaust gas reaching at the intake pipe 120 to the exhaust pipe 130 via the combustion chamber 110. As a result, it is possible to avoid the situation that the engine starting property is decreased.

Third Embodiment

Figure 4:
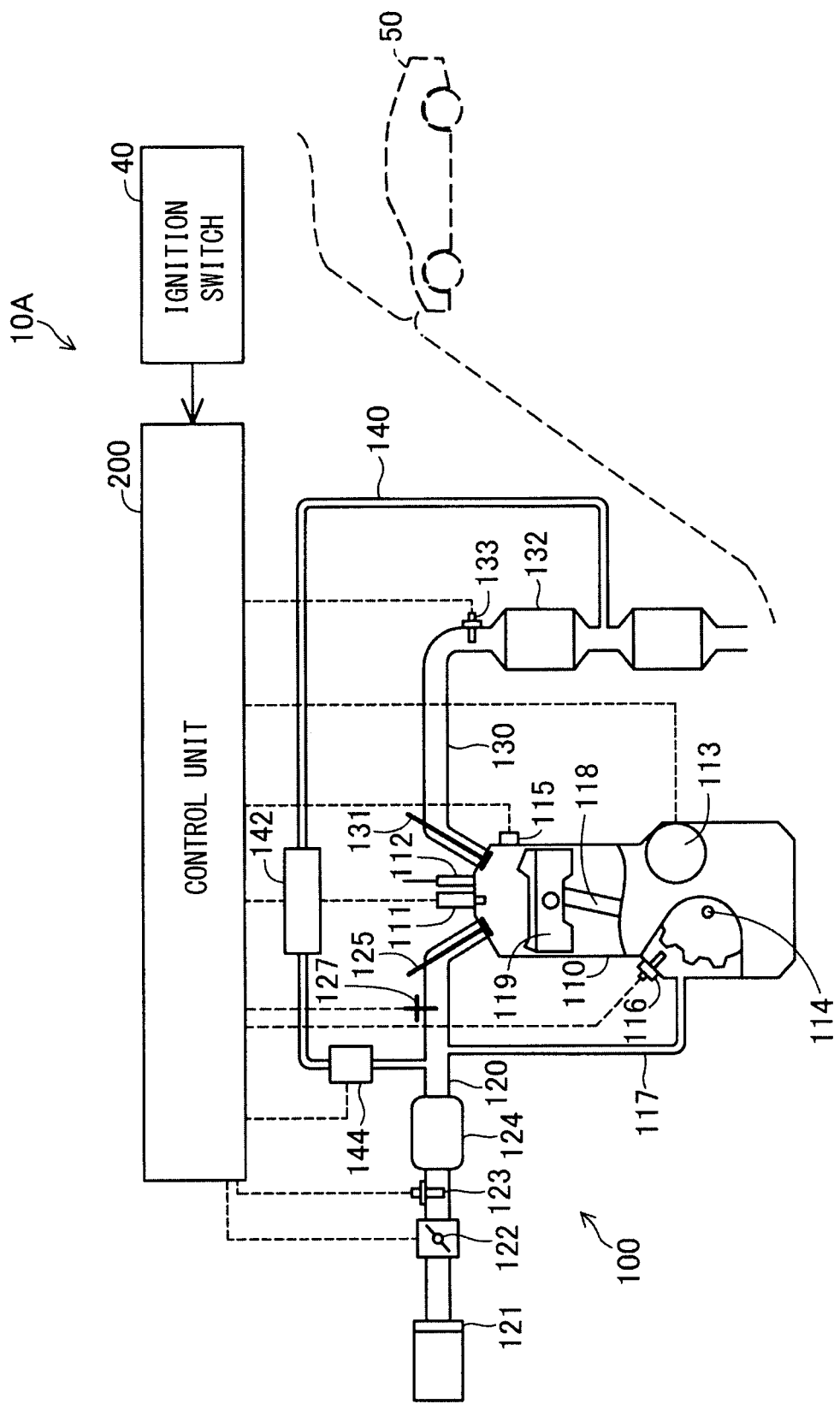
FIG. 4 is a schematic view showing an outline of a control system for an internal combustion engine according to a third embodiment.

An engine control system 10A of a third embodiment shown in FIG. 4 is different from the engine control system 10 of the first embodiment shown in FIG. 1 in that an oxygen sensor 127 is provided for detecting oxygen density of the gas in the intake pipe 120. The oxygen sensor 127 is provided in the intake pipe 120. The third embodiment carries out a fuel-injection amount control, instead of the exhaust-gas control of the first embodiment (the Ig-on control or the Ig-off control). The other structure of the engine control system 10A is the same to that of the engine control system 10 of the first embodiment. The fuel-injection amount control will be explained with reference to FIG. 5.

Figure 5:
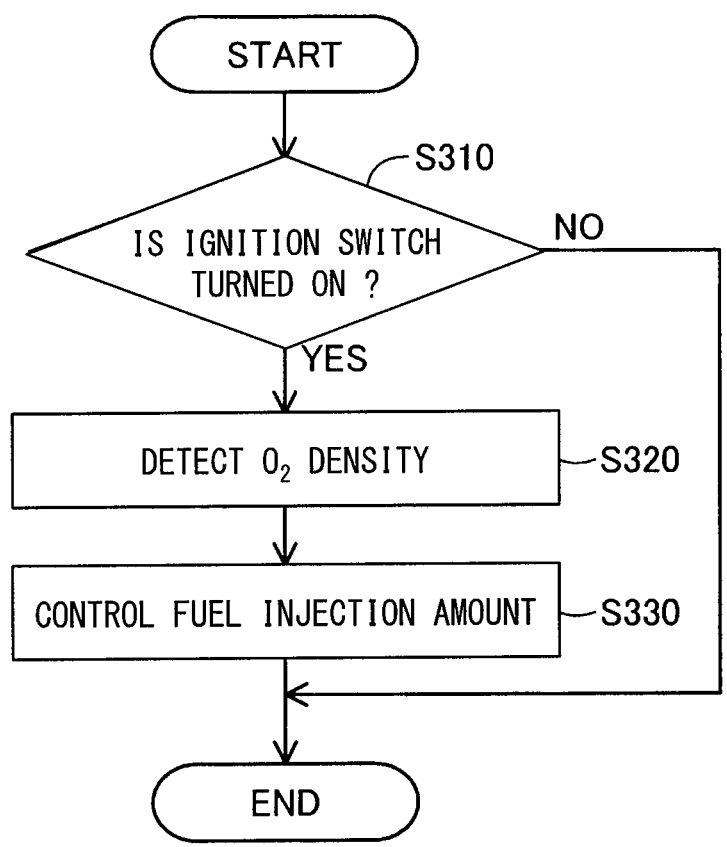
FIG. 5 is a flowchart showing a process for a fuel injection control according to the third embodiment.

The ECU 200 determines whether the ignition switch 40 is turned on or not at a step S310 of FIG. 5. When it determines that the ignition switch 40 is not turned on (NO at the step S310), the process of FIG. 5 goes to an end.

When the ECU 200 determines that the ignition switch 40 is turned on (YES at the step S310), the process goes to a step S320 at which the oxygen density in the intake pipe 120 is detected by the oxygen sensor 127. The ECU 200 adjusts at a step S330 an amount of the fuel to be injected from the fuel injector 112 depending on the oxygen density detected by the oxygen sensor 127, when the normal operation for the engine 100 is started. Thereafter, the process goes to the end. After the process of FIG. 5 is ended and when the normal operation for the engine 100 is started, the fuel is injected at the fuel injection amount adjusted at the step S330 of FIG. 5. For example, the fuel injection amount is made to be smaller, as the detected oxygen density is smaller. According to the above operation, it is possible to avoid the situation that the engine starting property is decreased, because the fuel injection amount is adjusted when the exhaust gas unintentionally reaches at the intake pipe 120. In addition, when the detected oxygen density is lower than a predetermined value, the fuel may not be injected but the cranking operation may be done by the starter motor 113. The oxygen density is decreased after the cranking operation is done without the fuel injection. Then, the fuel injection may be started thereafter.

Further Embodiments or Modifications

In the above embodiment, the double eccentric valve is provided as the on-off valve 144 in the EGR pipe 140. Any other type of the on-off valve, for example, the on-off valve to be used as an idle-speed control valve may be used as the on-off valve to be provided in the EGR pipe 140.

The present disclosure is not limited to the above embodiments or the modifications but can be further modified in various manners without departing from a spirit of the present disclosure.

What is claimed is:

1. A control system for an internal combustion engine comprising:
   a combustion chamber for combusting fuel therein;
   a piston movably provided in a cylinder of the internal combustion engine for forming the combustion chamber, a volume of which is changed when the piston is reciprocated;
   an intake pipe for supplying air to the combustion chamber;
   a throttle valve movably provided in the intake pipe and controlling an amount of the air to be supplied to the combustion chamber;
   a fuel injector for injecting fuel to provide air-fuel mixture in the combustion chamber;
   a spark plug provided in the internal combustion engine;
   an exhaust gas recirculation pipe for recirculating a part of exhaust gas emitted from the combustion chamber into the intake pipe;
   an on-off valve provided in the exhaust gas recirculation pipe and controlling an amount of the exhaust gas to be supplied to the combustion chamber; and
   a control unit for controlling each operation of the piston, the throttle valve, the fuel injector, the spark plug and the on-off valve,
   wherein the control unit carries out an Ig-on control when an ignition switch is turned on but before starting a normal operation for the combustion of the air-fuel mixture in the combustion chamber, and
   wherein, in the Ig-on control, an opening degree of the throttle valve and/or the on-off valve is made to be larger than that of a condition before the ignition switch is turned on, and the piston is reciprocated to discharge gas from the combustion chamber to an outside thereof in such a condition that the throttle valve and/or the on-off valve is opened larger, by not operating the spark plug and the fuel injector, and thereafter, the control unit starts the normal operation for the combustion of the air-fuel mixture in the combustion chamber by operating the spark plug and the fuel injector.

2. The control system according to claim 1, wherein the piston is reciprocated by a starter motor during the Ig-on control.

3. The control system according to claim 1, wherein, in the Ig-on control, both the opening degree of the throttle valve and the on-off valve are made to be larger than that of the condition before the ignition switch is turned on.

* * * * *